July 12, 1966            J. W. RIEKE            3,260,922

POWER SUPPLY

Filed June 27, 1962                      2 Sheets-Sheet 1

INVENTOR
J. W. RIEKE
BY
ATTORNEY

July 12, 1966

J. W. RIEKE 3,260,922

POWER SUPPLY

Filed June 27, 1962

INVENTOR
J. W. RIEKE
BY
ATTORNEY

United States Patent Office 3,260,922
Patented July 12, 1966

3,260,922
POWER SUPPLY
John W. Rieke, Basking Ridge, N.J., assignor to Bell Telephone Laboratories, Incorporated, New York, N.Y., a corporation of New York
Filed June 27, 1962, Ser. No. 205,793
8 Claims. (Cl. 321—47)

This invention relates to improvements in power supplies and, more particularly, to a circuit arrangement increasing the current-producing capacity of a power supply.

Power supplies converting alternating-current power to direct-current power are composed of one or more asymmetrically conducting circuit paths interconnecting the source of alternating-current power with the output terminals across which direct-current power appears. These circuit paths are each made up of a serial arrangement of components. For this reason the current-producing capacity of a power supply is fixed by the individual component in the series arrangement having the lowest current rating. The current-producing capacity of a conventional single phase, full-wave rectifier would be, for example, twice the lowest component current rating, since two circuit paths are present between the alternating-current source and direct-current output terminals in such a full-wave rectifier. There are, as might be expected, arrangements that avoid this limitation on power supply current-producing capacity but such circuits are characteristically more complex and thus bulkier and more costly than conventional power supply circuits.

Circuit components in power supplies, for example rectifiers, are generally assigned both current and reverse voltage ratings which if exceeded can result in component damage. These ratings considered together indicate the maximum power which can be safely rectified. It is considered good design practice to fully tax both the reverse voltage rating and current rating of a component in operation. With conventional power supply configurations, full utilization of both current and reverse voltage ratings of the components is usually not possible when a low voltage and high current direct-current output are specified. In this case components with high current ratings must be chosen. These components also have high reverse voltage ratings that greatly exceed the actual reverse voltages encountered.

The foregoing problems are particularly acute in the design of power supplies employing controlled rectifiers. Because of the more complex nature of controlled rectifiers, they have lagged behind simple uncontrolled rectifiers in technological development, including the ability to manufacture in commercial quantities devices with large current and reverse voltage ratings. Even when controlled rectifiers having the desired ratings are available, the cost of the device increases proportionally with its rating. Thus, economics dictates that in each application components with the smallest possible ratings should be used.

It is, therefore, the object of this invention simply and effectively to extend the current-producing capacity of a power supply beyond that of conventionally designed power supplies, particularly those employing controlled rectifiers.

In accordance with the above object, a source of alternating-current power and an output circuit comprising positive and negative terminals are interconnected by a full-wave rectifier having an asymmetrically conducting circuit path from each terminal of the alternating-current source to the positive terminal of the direct-current output circuit and a return asymmetrically conducting circuit path from the negative terminal of the direct-current output circuit to each terminal of the alternating-current source. Two energy storage elements are provided. Each of them has an energy releasing circuit connected to the direct-current output circuit to supply current to the output circuit of the same polarity as the current provided by the rectifier, thus augmenting it. The energy releasing circuits become operative alternately on opposite half cycles of the alternating-current signal. Each energy storage element also has an energy restoring circuit operative alternately on the half cycles in which its energy releasing circuit is inoperative.

More specifically, the full-wave rectifier can take the form of a bridge circuit and inductors, functioning as energy storage elements, can be placed in the arms of the bridge, one in each circuit path. This arrangement inherently accomplishes energy restorage in the inductors when the corresponding circuit paths are operative and carrying current. Diodes shunting each inductor across the output circuit, and poled to conduct current from the negative terminal to the positive terminal, constitute the energy releasing circuits. The diodes conduct releasing the energy in the inductors when the corresponding circuit paths are inoperative and not carrying current. Since some of the total current supplied to the output circuit results from the release of energy in the inductors in the described power supply, an increase in the current-producing capacity over conventional power supply arrangements is realized.

In one embodiment of the invention the bridge circuit may include one or more controlled rectifiers to permit regulation of direct-current output power. In such case, when the controlled rectifiers are nonconductive, both inductors release energy simultaneously into the output circuit, thus further increasing the current-producing capacity of the power supply.

The above and other features of the invention will be more fully understood from the following detailed description considered in conjunction with the drawings in which.

Figure 1:
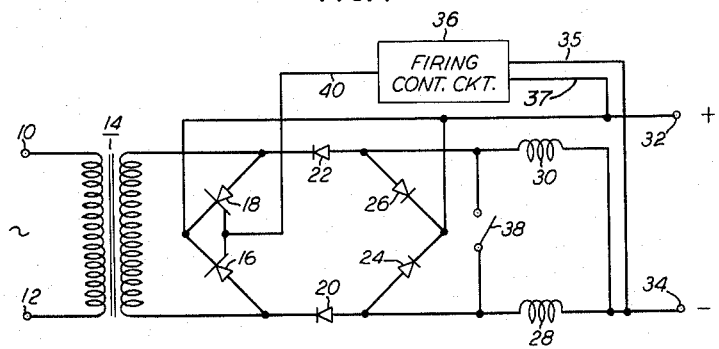
FIG. 1 is a schematic circuit diagram of a power supply illustrating the principles of the invention.

In FIG. 1 a pair of input terminals 10 and 12 is shown to which alternating-current power is applied. Alternating-current power is coupled by a transformer 14 to a bridge rectifier that converts the alternating-current power to direct-current power developed across output terminals 32 and 34. Two arms of the bridge rectifier are composed of controlled rectifiers 16 and 18 poled for conduction from the end terminals of the secondary winding of transformer 14 to output terminal 32. The other two arms of the bridge rectifier are composed of a diode 22 connected in series with an inductor 30 and a diode 20 connected in series with an inductor 28. Diodes 20 and 22 are poled for conduction from output terminal 34 to the end terminals of the secondary winding of transformer 14.

The mode of operation of the power supply of FIG. 1 will initially be explained with controlled rectifiers 16 and 18 operating as simple, uncontrolled diodes, as well they might be in actual applications.

During half cycles of one polarity of the alternating-current signal, current passes to output terminal 32 through rectifier 18, passes through the load (not shown but which can be connected to terminals 32 and 34), and returns to the secondary winding of transformer 14 through inductor 28 and diode 20. Energy is thus stored in inductor 28 by the passage of current through it. At the same time, additional current is provided to terminal 32 by the release of energy from inductor 30, which has been charged during cycles of the opposite polarity, through an energy releasing circuit comprising a diode 26.

On half cycles of the opposite polarity of the alternating-current signal, current is coupled from the secondary winding of transformer 14 to terminal 32, and thereafter to the load, via rectifier 16 and returns to the secondary winding of transformer 14 through inductor 30 and diode 22. This restores energy in inductor 30. During this half cycle, energy from inductor 28 is released causing current to flow through diode 24 to augment the current provided to the output circuit through the circuit path including rectifier 16 and diode 22. The release of energy from each of inductors 28 and 30 is stimulated by the reduction in current through its corresponding circuit path. This reduction in current through inductor 28 or 30 causes release of energy by developing a voltage across the inductor that produces a circulating current through diode 24 or 26, as the case may be, the load, and the inductor. By means of the described configuration, the total current available at output terminals 32 and 34 ideally is four times the current passing through each circuit path and thus four times the lowest component current rating. The ideal situation is based upon the premise that inductors 28 and 30 have infinite inductance. Although such an inductor is physically impossible to construct, inductors with very large inductance approach closely the ideal case. By way of comparison, the total current available in conventional full wave, power supply circuit arrangements is twice that passing through each circuit path.

If a regulated direct-current output is desired, rectifiers 16 and 18 can be controlled so as to conduct only during portions of each half cycle. The voltage across output terminals 32 and 34 is sampled by leads 37 and 35. A control signal is developed responsive to this voltage condition by a firing control circuit 36 and is applied through lead 40 to the control elements of controlled rectifiers 16 and 18. Firing control circuit 36 could, by way of example, be a circuit such as shown in FIG. 10.1, page 171, of the General Electric Silicon Controlled Rectifier Manual, second edition, 1961. When operating as a regulated power supply, still more output current is available. During intervals in which controlled rectifiers 16 and 18 are not operative both inductors 28 and 30 release energy causing added current to flow through the load. For example, if controlled rectifiers 16 and 18 are conductive only during one-half of each cycle, the current available across output terminals 32 and 34 in the ideal case is eight times the current passing through each circuit path and thus each controlled rectifier.

Figure 2:
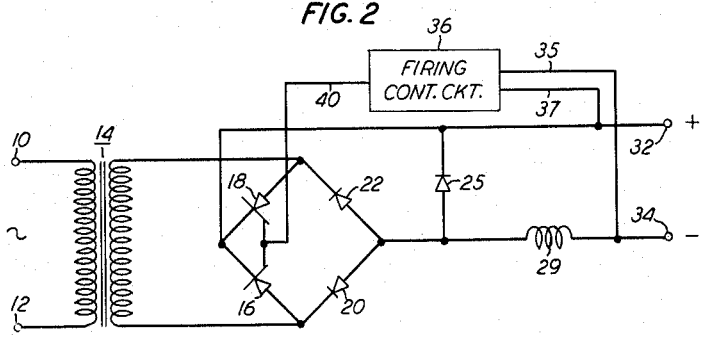
FIG. 2 is a schematic circuit diagram of the circuit modification resulting from closure of the switch in FIG. 1.

The circuit of FIG. 1 can be modified by simply closing a switch 38 situated between the unjoined terminals of inductors 28 and 30 to produce a direct-current output that has radically different current-voltage characteristics from the circuit described above. In this modified circuit, shown in FIG. 2, diode 25 is equivalent to diodes 24 and 26 (in FIG. 1) connected in parallel and an inductor 29 represents inductors 28 and 30 (in FIG. 1) connected in parallel. Although producing the same quantity of direct-current power across terminals 32 and 34, the modified power supply redistributes it as twice the voltage and one-half the current of the power supply of FIG. 1 with switch 38 open.

Figure 3:
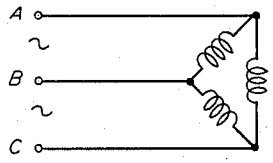
FIG. 3 is a schematic circuit diagram of an adaptation of the arrangement shown in FIG. 1 for three-phase power.
Figure 3:
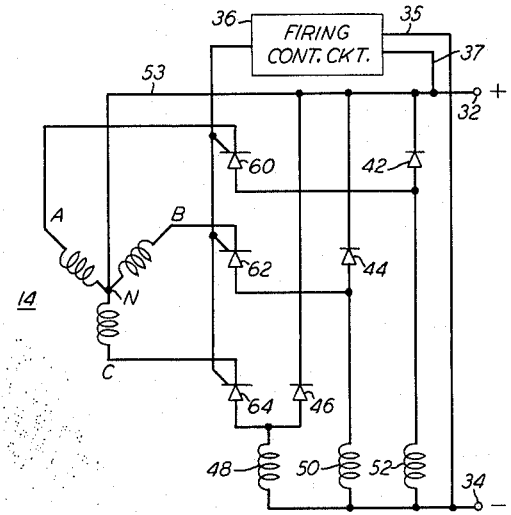

FIG. 3 discloses a three-phase, half wave rectifier illustrating the foregoing principles. Three-phase power is applied to terminals A, B and C and coupled to output terminals 32 and 34 by a three-phase transformer 14. The secondary windings of transformer 14 are Y-connected. Terminals A, B and C of the secondary windings of transformer 14 are connected to output terminal 34, respectively, by controlled rectifier 60 and inductor 52 connected in series, controlled rectifier 62 and inductor 50 connected in series, and controlled rectifier 64 and inductor 48 connected in series. Diodes 42, 44 and 46 connect inductors 52, 50 and 48, respectively, to output terminal 32. Output terminal 32 is joined directly to junction point N of the Y-connected secondary windings by a connection 53. In operation, when controlled rectifiers 60, 62 and 64 are functioning as simple rectifiers, current is delivered to output terminal 32 from each winding in turn as its end terminal becomes more negative than junction point N. Current is returned from output terminal 34 to the winding through its respective rectifier, thus restoring energy in the corresponding inductor. The inductor or inductors whose rectifiers are not conducting, release energy causing current flow across output terminals 32 and 34 thus augmenting the current passing through the conducting rectifier. As described above in conjunction with FIG. 1, when regulation is practiced each secondary winding only delivers power to output terminal 32 when its corresponding controlled rectifier is rendered operative. At other times all of inductors 48, 50 and 52 are releasing energy that causes current to flow across output terminals 32 and 34.

Figure 4:
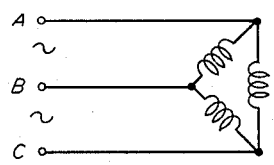
FIG. 4 is a schematic circuit diagram of another adaptation of the circuit arrangement of FIG. 1 for three-phase power.
Figure 4:
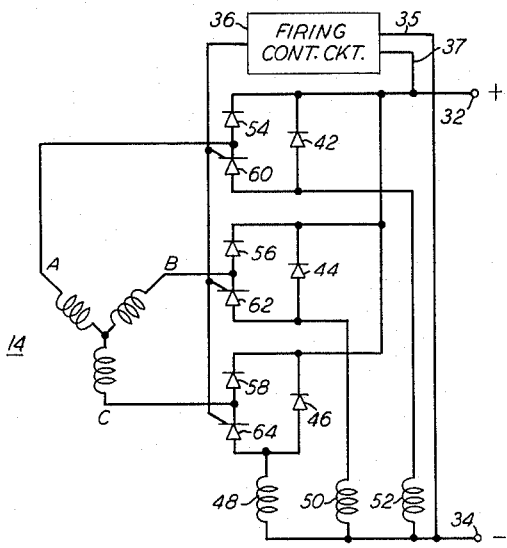

In FIG. 4 another three-phase, full wave power supply is illustrated employing the principles of the invention. Three-phase power applied to terminals A, B and C is coupled to output terminals 32 and 34 by a three-phase transformer having Y-connected secondary windings. The power supply of FIG. 4 is similar to the one disclosed in FIG. 3, except it is arranged for full wave rectification (whereas the power supply of FIG. 3 is a half wave rectifier) by the substitution of diodes 54, 56 and 58 in circuit between end terminals A, B and C, respectively, of the secondary windings of transformer 14 and terminal 32 for connection 53 (in FIG. 3). In other respects the full wave circuit operates like the arrangement of FIG. 3.

What is claimed is:

1. A power supply comprising a source of alternating current, a rectifier, means for coupling said source to the input of said rectifier, first and second inductors, an output circuit, means for coupling the otuput of said rectifier to said output circuit including circuit means effective to release energy stored in said inductors through said output circuit and circuit means effective to restore energy in said inductors alternately on opposite half cycles of the alternating-current signal.

2. A power supply comprising a source of alternating current, an output circuit, a full wave rectifier coupling said source to said output circuit, first and second inductors, means during half cycles of the alternating-current signal of one polarity for releasing energy in said first inductor through said output circuit and restoring energy in said second inductor, and means during half cycles of the alternating-current signal of the opposite polarity for releasing energy in said second inductor through said output circuit and restoring energy in said first inductor.

3. A power supply comprising a source of alternating current, an output circuit, a full wave rectifier having a controllable conduction characteristic coupling said source to said output circuit, first and second inductors, means during half cycles of the alternating-current signal of one polarity for releasing energy in said first inductor through said output circuit and restoring energy in said second inductor, means during half cycles of the alternating-current signal of the opposite polarity for releasing energy in said second inductor through said output circuit and restoring energy in said first inductor, and means for controlling the conduction characteristic of said rectifier responsive to the conditions existing at said output circuit.

4. A power supply circuit comprising a transformer, a source of alternating-current power, an output circuit, a rectifier coupling the secondary winding of said transformer to said output circuit, said rectifier providing first and second transmission paths to said output circuit, said paths being operative on alternate half cycles of said source, an inductor situated in each of said transmission paths, and a diode corresponding to each of said transmission paths situated to complete a signal path between each of said inductors and said output circuit when the transmission path in which said inductor is situated becomes inoperative.

5. A power supply comprising a source of alternating current, a full-wave bridge rectifier having four arms each including a diode, a transformer for coupling said source to the alternating-current terminals of said bridge, positive and negative output terminals coupled to the direct-current terminals of said bridge, a first inductor situated in one of said arms, one terminal of said first inductor being connected to one of said output terminals, a first diode connected between said other terminal of said first inductor and said other output terminal, a second inductor situated in another of said arms, one terminal of said second inductor being connected to said one output terminal, a second diode connected between said other terminal of said second inductor and said other output terminal, said two last-mentioned diodes being poled to conduct current from said negtaive to said positive output terminal, and a switch capable of connecting together said other terminals of said inductors.

6. A power supply comprising a source of alternating current, a pair of output terminals, first, second, third, and fourth asymmetrically conducting devices, first and second inductors, means for serially connecting said first asymmetrically conducting device, said output terminals, said first inductor, said second asymmetrically conducting device and said source, means for serially connecting said third asymmetrically conducting device, said load, said second inductor, said fourth asymmetrically conducting device and said source, means for connecting said first inductor in parallel with said output terminals during intervals in which said first device is nonconducting, and means for connecting said second inductor in parallel with said output terminals during intervals in which said third device is nonconductive.

7. A polyphase power supply comprising a three-phase source of alternating current, a transformer having a plurality of secondary windings each with one terminal connected to a common point and a plurality of primary windings connected to said source, a pair of output terminals, a first diode interconnecting the other terminal of each of said secondary windings with one of said output terminals, a second diode and an inductor interconnecting said other terminal of each of said secondary windings with said other output terminal, and a third diode providing a path for current flow from each inductor through said output terminals during intervals of time in which its corresponding second diode is nonconductive.

8. In a polyphase power supply, a source of three-phase alternating current, a transformer having a plurality of primary windings and a plurality of secondary windings, said primary windings being connected to said source one terminal of each of said secondary windings connected to a common junction point, positive and negative output terminals, means for interconnecting said junction to one of said output terminals, an inductor and a diode connected in series between the other of said output terminals and the other of each of said secondary windings, and a diode connecting each inductor in parallel with said output terminals, said diode being poled for conduction of current from said negative to positive output terminals.

References Cited by the Examiner

FOREIGN PATENTS 221,673 6/1962 Austria.
1,207,949 9/1959 France.

OTHER REFERENCES

"Electronics," article by A. A. Sorenson, published Nov. 25, 1960, pp. 121–123.

JOHN F. COUCH, *Primary Examiner.*

LLOYD McCOLLUM, *Examienr.*

M. L. WACHTEL, A. J. GAJARSA, *Assistant Examiners.*